United States Patent
VanBlon et al.

(10) Patent No.: US 10,546,428 B2
(45) Date of Patent: Jan. 28, 2020

(54) AUGMENTED REALITY ASPECT INDICATION FOR ELECTRONIC DEVICE

(71) Applicant: Lenovo (Singapore) Pte. Ltd., Singapore (SG)

(72) Inventors: Russell Speight VanBlon, Raleigh, NC (US); Nathan J. Peterson, Oxford, NC (US); John Carl Mese, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/895,529

(22) Filed: Feb. 13, 2018

(65) Prior Publication Data

US 2019/0251748 A1    Aug. 15, 2019

(51) Int. Cl.
  *G06T 19/00*   (2011.01)
  *G06K 9/00*    (2006.01)
  *H04W 8/00*    (2009.01)

(52) U.S. Cl.
  CPC ........ *G06T 19/006* (2013.01); *G06K 9/00671* (2013.01); *G06T 2219/004* (2013.01); *H04W 8/005* (2013.01)

(58) Field of Classification Search
  None
  See application file for complete search history.

(56) References Cited

U.S. PATENT DOCUMENTS

| | | | | |
|---|---|---|---|---|
| 9,055,404 | B2* | 6/2015 | Setlur | H04W 4/023 |
| 9,342,930 | B1* | 5/2016 | Kraft | G06T 19/006 |
| 9,785,247 | B1* | 10/2017 | Horowitz | G06F 3/017 |
| 2013/0293584 | A1* | 11/2013 | Anderson | G06T 11/00 |
| | | | | 345/633 |
| 2013/0342564 | A1* | 12/2013 | Kinnebrew | G09G 3/003 |
| | | | | 345/619 |
| 2014/0108567 | A1* | 4/2014 | Borger | H04L 51/32 |
| | | | | 709/206 |
| 2015/0187139 | A1* | 7/2015 | Ahn | G06F 16/5866 |
| | | | | 345/633 |
| 2016/0147492 | A1* | 5/2016 | Fugate | G06F 3/1423 |
| | | | | 345/633 |
| 2017/0087465 | A1* | 3/2017 | Lyons | G07F 17/3211 |
| 2017/0195128 | A1* | 7/2017 | Ng | H04L 12/1822 |
| 2018/0196522 | A1* | 7/2018 | Rochford | G06F 1/163 |
| 2018/0204385 | A1* | 7/2018 | Sarangdhar | G06F 3/011 |
| 2018/0211447 | A1* | 7/2018 | Spayd | G09B 5/06 |
| 2018/0239425 | A1* | 8/2018 | Jang | G06F 3/013 |

* cited by examiner

*Primary Examiner* — David H Chu
(74) *Attorney, Agent, or Firm* — Ference & Associates LLC

(57) ABSTRACT

One embodiment provides a method, including: detecting, using at least one sensor, an electronic device; determining, using a processor, a type of the electronic device; and providing, on a display of an augmented reality system and based on the type of the electronic device, an indication of at least one aspect of the electronic device. Other aspects are described and claimed.

16 Claims, 3 Drawing Sheets

AUGMENTED REALITY ASPECT INDICATION FOR ELECTRONIC DEVICE

BACKGROUND

Advances in technology have increased the capabilities of information handling devices ("devices"), for example smart phones, tablet devices, smart speakers, smart TVs, laptop and personal computers, and the like. For example, many modern devices may be able to receive and process input using a plurality of new input methods such as through voice input, gesture input, gaze input, and the like. These modern devices may often be found intermixed with conventional information handling devices that may not contain these new interactive capabilities.

BRIEF SUMMARY

In summary, one aspect provides a method, comprising: detecting, using at least one sensor, an electronic device; determining, using a processor, a type of the electronic device; and providing, on a display of an augmented reality system and based on the type of the electronic device, an indication of at least one aspect of the electronic device.

Another aspect provides an information handling device, comprising: at least one sensor; a display of an augmented reality system; a processor; a memory device that stores instructions executable by the processor to: detect an electronic device; determine a type of the electronic device; and provide, based on the type of the electronic device, an indication of at least one aspect of the electronic device on the display.

A further aspect provides a product, comprising: a storage device that stores code, the code being executable by a processor and comprising: code that detects an electronic device; code that determines a type of the electronic device; and code that provides, based on the type of the electronic device, an indication of at least one aspect of the electronic device on a display of an augmented reality system.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
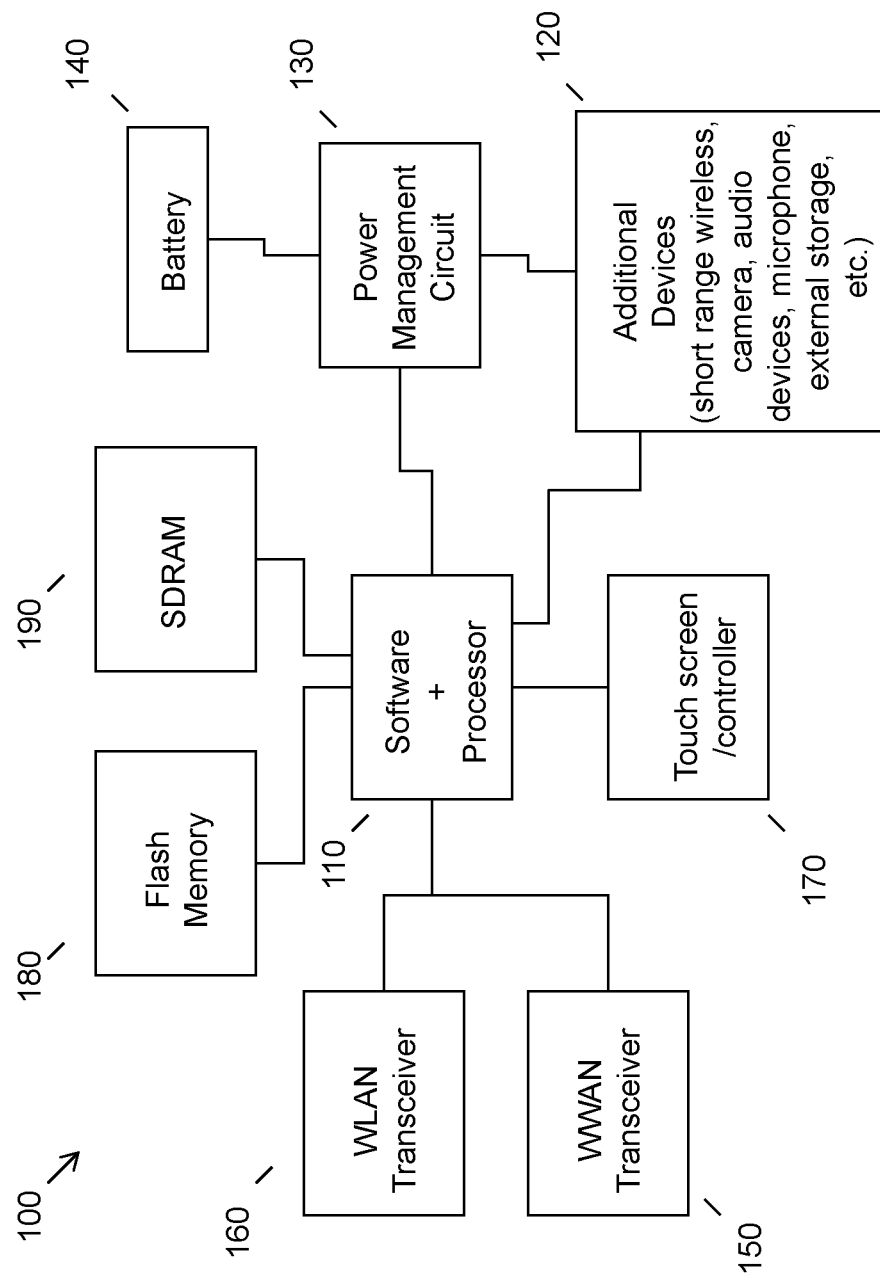
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

As the functions and capabilities of devices increase, users of these devices may have an increasingly difficult time identifying the appropriate input means of each device. This issue is especially apparent when modern devices are intermixed with older devices that do not support advanced input means but may nevertheless share a similar aesthetic appearance to the modern device. For example, a user accustomed to providing voice input to their smart TV at home may look silly if they attempted to provide voice input to another TV that is unable to receive and process voice inputs. In a similar example, a user may attempt to provide touch input to a display screen of a laptop only to find out that the laptop does not support touch input. In these situations, a user may have to perform "trial-and-error" input techniques until they are able to determine an appropriate input modality.

Conventionally, some devices may be able to present their input capabilities to a user (e.g., using a display screen operatively coupled to the device, etc.). For example, a device may be able to display one or more icons that each corresponds to a different input capability (e.g., a microphone icon for voice input, a finger icon for touch input, etc.). However, a user may not be apprised of this information if a device's screen is not currently active or the device is powered off. Additionally, some devices may require additional external peripheral/companion devices (e.g., cameras, etc.) to identity certain types of input (e.g., gesture inputs, etc.). Conventional methods may indicate, for example, that a device is capable of processing gesture inputs but may not indicate whether or not the required external device (e.g., camera, etc.) is connected or currently operational.

Accordingly, an embodiment provides a method for providing an indication of at least one aspect of an identified electronic device on a display of an augmented reality system. In an embodiment, one or more sensors (e.g., image sensors, eye tracking sensors, etc.) may be used to detect the presence of a proximate electronic device and/or detect that a user is looking at an electronic device. An embodiment may then determine a type, or model, of the electronic device and thereafter provide on a display of an augmented reality system an indication of at least one aspect (e.g., an input capability, an output capability, a device power status, a charge status, etc.) associated with the type of the electronic device. For example, an embodiment may be able to detect that a user is looking at a TV, determine that the TV is a smart TV of a particular model and/or brand, and thereafter display one or more input capabilities of that model to a user in an augmented reality display (e.g., where the input capabilities are represented by augmented reality content, etc.). Such a method may apprise the user of the input capabilities and/or other aspects of a particular electronic device prior to the user attempting to provide input to the electronic device.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, a thermal sensor, etc. System 100 often includes a touch screen 170 for data input and display/rendering. System 100 also typically includes various memory devices, for example flash memory 180 and SDRAM 190.

Figure 2:
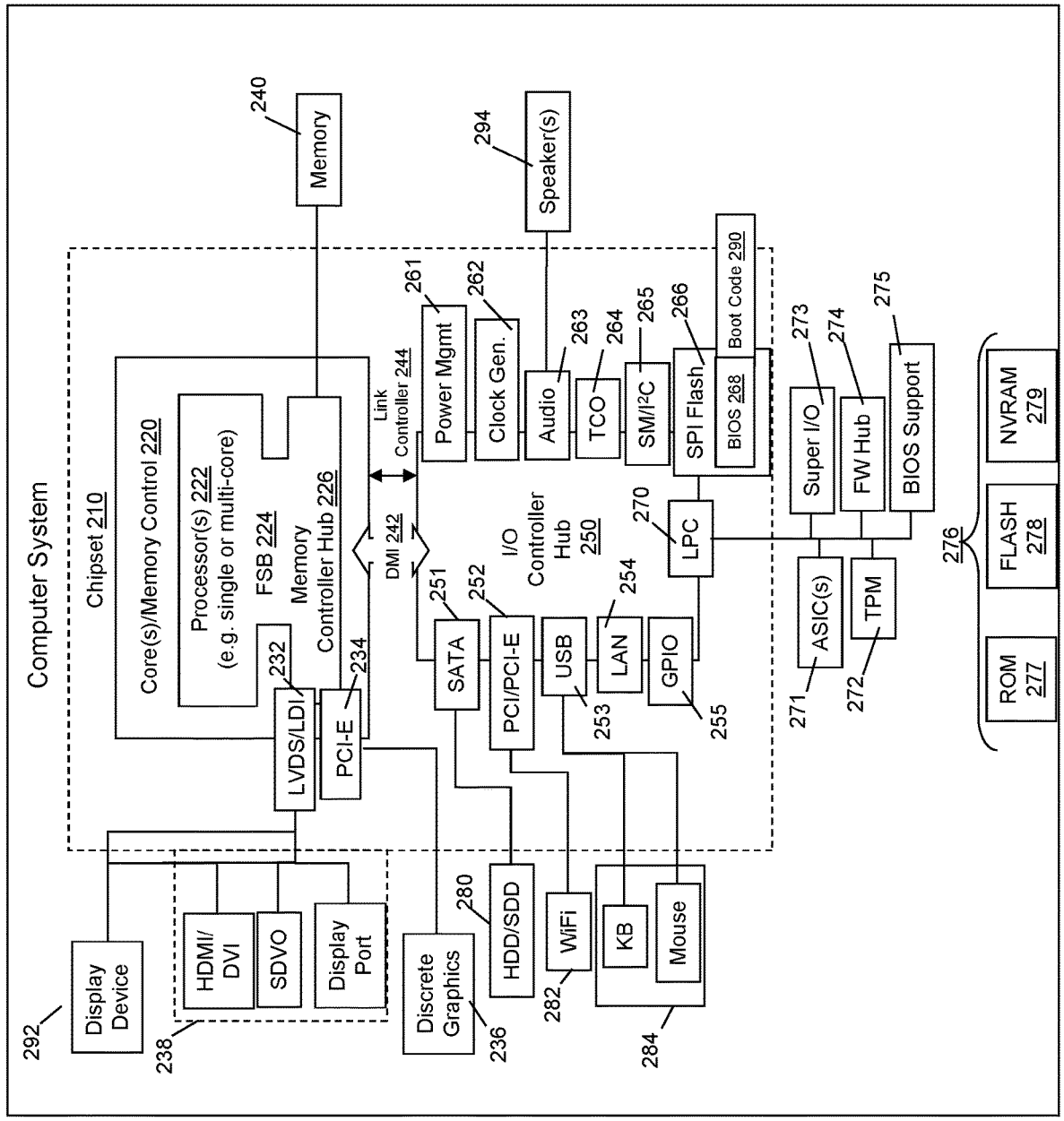
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as tablets, smart phones, wearable headsets, personal computer devices generally, and/or electronic devices that are capable of displaying augmented reality content and that may perform various functions responsive to receiving user input. For example, the circuitry outlined in FIG. 1 may be implemented in a tablet or smart phone embodiment, whereas the circuitry outlined in FIG. 2 may be implemented in a personal computer embodiment.

Figure 3:
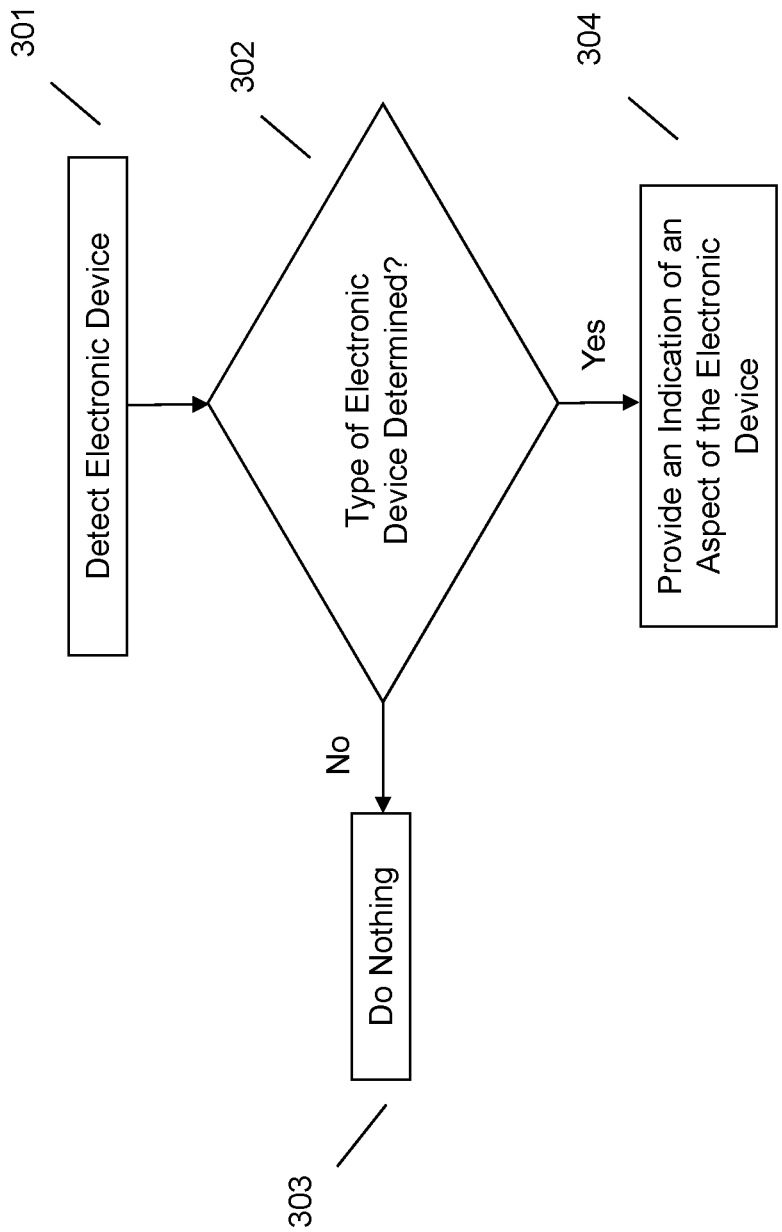
FIG. 3 illustrates an example method of providing an indication of at least one aspect of an identified electronic device on a display of an augmented reality system.

Referring now to FIG. 3, an embodiment may provide an indication of at least one aspect of an identified electronic device on a display of an augmented reality system. At 301, an embodiment may detect an electronic device using one or more sensors. In the context of this application the electronic device may be virtually any type of conventional or "smart" electronic device. In an embodiment, one or more sensors may be used to detect the electronic device. These electronic device detecting sensors may be one or more of an image sensor, eye tracking sensor, wireless signal receiver, other electronic device detecting sensor, and the like.

In an embodiment, the electronic device detecting sensors may be integral to a user device capable of displaying augmented reality ("AR") content such as an AR headset (e.g., Google Glass®, Microsoft Hololens®, etc.), smart phone, tablet, and the like. For example, an AR headset may be disposed with a camera capable of capturing images of electronic devices. Alternatively, the electronic device detecting sensors may be disposed on another device and may transmit detected electronic device data to the user device. For example, image data associated with an electronic device may be captured by an independent camera that may subsequently transmit the captured image to the user's AR device. Electronic device related data may be communicated from other sources to the user's AR device via a wireless connection (e.g., using a BLUETOOTH connection, near field communication (NFC), wireless connection techniques, etc.), a wired connection (e.g., the device is coupled to another device or source, etc.), through a connected data storage system (e.g., via cloud storage, remote storage, local storage, network storage, etc.), and the like. For simplicity purposes, the majority of the discussion herein will involve AR content displayed on an AR headset. However, it should be understood that generally any AR-capable device may be utilized to display AR content.

In an embodiment, the electronic device detecting sensors may be configured to continuously search for and detect electronic device related data by maintaining one or more sensors in an active state. The one or more sensors may, for example, continuously detect electronic device data even when other sensors (e.g., microphones, speakers, other sensors, etc.) associated with the AR device are inactive. Alternatively, the electronic device detecting sensors may remain in an active state for a predetermined amount of time (e.g., 30 minutes, 1 hour, 2 hours, etc.). Subsequent to not capturing any electronic device related data during this predetermined time window, an embodiment may switch the electronic device detecting sensors to a power off state. The predetermined time window may be preconfigured by a manufacturer or, alternatively, may be configured and set by one or more users. In another embodiment, the electronic device detecting sensors may attempt to detect an electronic device responsive to receiving a user command to detect. For example, a user wearing an AR headset may be looking in a particular direction and provide a command input (e.g., voice input, touch input, gesture input, etc.) to begin detecting for an electronic device in the user's field of view.

At 302, an embodiment may determine a type of the electronic device. In an embodiment, the type of the electronic device may refer to a general kind of electronic device (e.g., a TV, a laptop, a phone, etc.), a brand (e.g., Lenovo®, Sony®, Samsung®, etc.), a specific model, a combination thereof, and the like. In an embodiment, the type of the electronic device may be determined using one or more device identification techniques. In an embodiment, as part of the electronic device determination, an embodiment may identify one or more aspects that correspond to the type of the electronic device. For example, an embodiment may determine an input method capability, an output method capability, a device support capability, a battery charge status, a security alarm status, a device activation methodology, a device power state, and other aspects of the electronic device not explicitly mentioned here.

In an embodiment, one of the electronic device detecting sensors may be an image capture device such as a camera. The camera may capture one or more images of the electronic device that may then be compared against a database of images of other electronic devices. Responsive to identifying a match between the electronic device in the captured image and at least one of the electronic devices in the database of images, an embodiment may conclude that a type for the detected electronic device has been determined. An embodiment may further access any data associated with the at least one electronic device in the database. For example, each electronic device in the database may comprise device identification data associated with it that may list and/or elaborate on one or more aspects of the electronic device. An embodiment may therefore associate the listed aspects of the electronic device in the database with the detected electronic device.

In an embodiment, an AR device may receive device identification data directly from an electronic device. In the context of this application, device identification data may be data transmitted from the electronic device to the AR device that may identify the type of the electronic device. For example, an electronic device may transmit a device signature, a device serial code, a device name, a device image a device serial code, a combination thereof, and the like to the AR device. The device identification data may be communicated to the AR device using a wireless or wired connection, for example, a BLUETOOTH connection, near field communication (NFC), cloud communication, through a network connection, or other wireless or wired transmission technique.

Responsive to not determining, at 302, a type of the electronic device, an embodiment may, at 303, take no additional action. However, responsive to determining, at 302, a type of the electronic device, an embodiment may provide, at 304, an indication of at least one aspect of the type of electronic device on a display of an augmented reality system (e.g., an AR device such as an AR headset, etc.).

In an embodiment, the provision of the indication may be provided automatically and without additional user input. More particularly, in an embodiment, the provision of the indication may be provided prior to receiving an explicit command from a user to provide the indication. For example, an embodiment may immediately provide the indication responsive to detecting that a user is gazing at a particular electronic device.

In an embodiment, the indication of an aspect may comprise a visual indication, an audible indication, a combination thereof, and the like. With respect to the visual indication, an embodiment may display one or more AR icons on a portion of the display (e.g., at a location proximate the electronic device, at a predetermined location on a display, etc.). Each of the AR icons may correspond to a different aspect of the detected electronic device. For example, a voice input capability may be represented by a picture of a microphone, a touch input capability may be represented by a picture of a finger, an audible output capability may be represented by a picture of a speaker, a device support capability may be represented by a picture of each device capable of interacting with the electronic device, and the like. As another example, the visual indication may take the form of a pop-up window that may list the aspects associated with the electronic device. With respect to the audible indication, an embodiment may audibly describe (e.g., using one or more speakers, etc.) the aspects of the detected electronic device.

In an embodiment, if two or more electronic devices are detected in a user's field of view, an embodiment may simultaneously provide an indication of aspects associated with each electronic device. In such a situation, an embodiment may determine the types of each electronic device and thereafter display the aspects corresponding to each electronic device on different portions of the display (e.g., proximate to the corresponding electronic device, in a split-menu, etc.). For example, if an embodiment detects that two laptops are located next to each in a user's field of view, an embodiment may indicate that the laptop on the left side of the user's field of view is capable of receiving touch inputs to the display (e.g., indicated by provision of a finger icon, etc.) whereas the laptop on the right side of the user's field of view is only capable of receiving keyboard input (e.g., indicated by provision of a keyboard icon, etc.).

In an embodiment, another detected user device may be identified that is proximate to the AR device. The other user device may be, for example, a user's smart phone, smart watch, laptop, etc. The other user device may communicate it's presence to the AR device using a BLUETOOTH connection, near field communication (NFC), another wireless connection technique, and the like. An embodiment may then provide an indication (e.g., an augmented icon, etc.) that the other user device has been recognized by the AR device. In another embodiment, responsive to detecting an electronic device, an embodiment may provide an interaction capability between the other user device and the electronic device. For example, an embodiment may provide an indication regarding how a user may use their smart phone to control a smart TV. In another embodiment, regardless of whether another user device is detected, an embodiment may provide an indication of devices that may be used to interact with and are supported by the electronic device.

In an embodiment, the indication of an aspect associated with an electronic device may only be provided the first time, or the first N times, a user encounters the electronic device. For example, the first time a user encounters a particular laptop, an embodiment may provide an indication that the laptop has a touch input capability. On a subsequent encounter with the same laptop, an embodiment may no longer provide the touch input capability notification, however, may still provide an indication of one or more other aspects associated with the electronic device (e.g., a device power state, a battery charge status, etc.).

The various embodiments described herein thus represent a technical improvement to conventional electronic device aspect determination and presentation techniques. Using the techniques described herein, an embodiment may detect an electronic device (e.g., using an AR headset and in a user's field of view, etc.) and thereafter determine a type of that electronic device. An embodiment may then provide an indication of at least one aspect of the type of electronic device on a display of an augmented reality system (e.g., an AR headset, etc.). Such techniques enable a user to be apprised of aspects of detected electronic devices prior to attempting to provide input to those electronic devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
    detecting, using at least one sensor, an electronic device;
    determining, using a processor, a type of the electronic device;
    identifying a user device capable of interacting with the electronic device; and
    providing, on a display of an augmented reality system and based on the type of the electronic device, an indication of at least one interaction capability between the user device and the electronic device.

2. The method of claim 1, wherein the at least one sensor comprises an image capture device and wherein the detecting comprises capturing, using the image capture device, an image of the electronic device.

3. The method of claim 2, wherein the determining comprises comparing the image of the electronic device to a database of images of other electronic devices.

4. The method of claim 1, wherein the detecting comprises detecting the electronic device using gaze detection.

5. The method of claim 1, wherein the determining comprises receiving device identification information from the electronic device.

6. The method of claim 1, wherein the indication comprises at least one of an image and an audible message.

7. The method of claim 6, wherein the image comprises a plurality of images, each of the plurality of images corresponding to a different aspect of the at least one aspect of the electronic device.

8. The method of claim 1, wherein the providing further comprises providing an indication of at least one aspect of the electronic device, wherein the at least one aspect is at least one aspect selected from the group consisting of an input method capability, an output method capability, a device support capability, a battery charge status, a security alarm status, a device activation methodology, and a device power state.

9. An information handling device, comprising:
    at least one sensor;
    a display of an augmented reality system;
    a processor;
    a memory device that stores instructions executable by the processor to:
    detect an electronic device;
    determine a type of the electronic device;
    identify a user device capable of interacting with the electronic device; and
    provide, based on the type of the electronic device, an indication of at least one interaction capability between the user device and the electronic device on the display.

10. The augmented reality device of claim 9, wherein the at least one sensor comprises an image capture device and wherein the instructions executable by the processor to detect comprise instructions executable by the processor to capture, using the image capture device, an image of the electronic device.

11. The augmented reality device of claim 10, wherein the instructions executable by the processor to determine comprise instructions executable by the processor to compare the image of the electronic device to a database of images of other electronic devices.

12. The augmented reality device of claim 9, wherein the instructions executable by the processor to determine comprise instructions executable by the processor to receive device identification information from the electronic device.

13. The augmented reality device of claim 9, wherein the indication comprises at least one of an image and an audible message.

14. The augmented reality device of claim 13, wherein the image comprises a plurality of images, each of the plurality of images corresponding to a different aspect of the at least one aspect of the electronic device.

15. The augmented reality device of claim 9, wherein the instructions executable by the processor to provide comprise instructions executable by the processor to provide an indication of at least one aspect of the electronic device, wherein the at least one aspect is at least one aspect selected from the group consisting of an input method capability, an output method capability, a device support capability, a battery charge status, a security alarm status, a device activation methodology, and a device power state.

16. A product, comprising:
    a storage device that stores code, the code being executable by a processor and comprising:
    code that detects an electronic device;
    code that determines a type of the electronic device;
    code that identifies a user device capable of interacting with the electronic device; and
    code that provides, based on the type of the electronic device, an indication of at least one interaction capability between the user device and the electronic device on a display of an augmented reality system.

* * * * *